(12) United States Patent
Wang et al.

(10) Patent No.: US 12,334,591 B2
(45) Date of Patent: Jun. 17, 2025

(54) BATTERY MODULE, BATTERY PACK, AND DEVICE USING SECONDARY BATTERY

(71) Applicant: CONTEMPORARY AMPEREX TECHNOLOGY (HONG KONG) LIMITED, Hong Kong (CN)

(72) Inventors: Yongguang Wang, Fujian (CN); Xingdi Chen, Fujian (CN); Peng Wang, Fujian (CN); Yu Tang, Fujian (CN); Jinqing Ji, Fujian (CN); Zhanyu Sun, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 528 days.

(21) Appl. No.: 17/735,511

(22) Filed: May 3, 2022

(65) Prior Publication Data

US 2022/0263201 A1 Aug. 18, 2022

Related U.S. Application Data

(63) Continuation of application No. PCT/CN2020/141800, filed on Dec. 30, 2020.

(30) Foreign Application Priority Data

Apr. 3, 2020 (CN) .......................... 202010259301.1

(51) Int. Cl.
*H01M 50/503* (2021.01)
(52) U.S. Cl.
CPC ...... *H01M 50/503* (2021.01); *H01M 2220/20* (2013.01)

(58) Field of Classification Search
None
See application file for complete search history.

(56) References Cited

U.S. PATENT DOCUMENTS

2010/0266887 A1   10/2010   Sekino et al.
2015/0140393 A1   5/2015    Yamamoto et al.
(Continued)

FOREIGN PATENT DOCUMENTS

CN   101809786 A   8/2010
CN   205583030 U   9/2016
(Continued)

OTHER PUBLICATIONS

Machine Translation CN107305938 (Year: 2017).*
(Continued)

*Primary Examiner* — Wyatt P McConnell
(74) *Attorney, Agent, or Firm* — Scully, Scott, Murphy & Presser, P.C.

(57) ABSTRACT

This application discloses a battery module, a battery pack, and a device using a secondary battery. The battery module includes: a battery cell assembly, including at least two battery cells arranged along a third direction, where each of the battery cells includes electrode terminals; and a first busbar, including a main portion and two connecting portions, where an extension direction of the first busbar tilts against the third direction at a preset angle, the two connecting portions are connected to the electrode terminals of the two battery cells in an identical battery cell assembly respectively, the main portion is connected between the two connecting portions, a deformation inducing portion is disposed on the main portion, and the deformation inducing portion is configured to reduce at least a force required for deforming the main portion along a first direction.

14 Claims, 7 Drawing Sheets

(56) References Cited

U.S. PATENT DOCUMENTS

| | | |
|---|---|---|
| 2015/0270525 A1 | 9/2015 | Jeong et al. |
| 2016/0172648 A1 | 6/2016 | Park et al. |
| 2018/0123161 A1 | 5/2018 | Xing et al. |
| 2019/0386353 A1 | 12/2019 | Jang et al. |
| 2021/0036296 A1 | 2/2021 | Nobuhira et al. |
| 2021/0135318 A1* | 5/2021 | Wen .................. H01M 50/209 |

FOREIGN PATENT DOCUMENTS

| | | |
|---|---|---|
| CN | 107305938 A | 10/2017 |
| CN | 206610860 U | 11/2017 |
| CN | 108023055 A | 5/2018 |
| CN | 109768206 A | 5/2019 |
| CN | 209071486 U | 7/2019 |
| CN | 209104250 U | 7/2019 |
| CN | 110402504 A | 11/2019 |
| CN | 209730034 U | 12/2019 |
| CN | 209963117 U | 1/2020 |
| EP | 2202825 A1 | 6/2010 |
| JP | 2005222703 A | 8/2005 |
| JP | 2009087720 A | 4/2009 |
| JP | 2011070872 A | 4/2011 |
| JP | 2013020731 A | 1/2013 |
| JP | 2013073929 A | 4/2013 |
| JP | 2014103031 A | 6/2014 |
| JP | 2015515096 A | 5/2015 |
| JP | 2017195056 A | 10/2017 |
| JP | 2018037160 A | 3/2018 |
| KR | 1020050037690 A | 4/2005 |
| KR | 20170027498 A | 3/2017 |
| KR | 20190112579 A | 10/2019 |
| WO | 2015043869 A1 | 4/2015 |
| WO | 2019187312 A1 | 10/2019 |

OTHER PUBLICATIONS

International Search Report dated Mar. 31, 2021 issued in PCT/CN2020/141800.
Notice of Reasons for Refusal dated Dec. 4, 2023 received in Japanese Patent Application No. JP 2022-530958.
First Office Action dated May 31, 2022 received in Chinese Patent Application No. CN 202010259301.1.
Notification to Grant Patent Right for Invention dated Oct. 8, 2022 received in Chinese Patent Application No. CN 202010259301.1.
Extended European Search Report dated Dec. 20, 2022 received in European Patent Application No. EP 20929221.8.
Notice of Reasons for Refusal dated Jun. 26, 2023 received in Japanese Patent Application No. JP 2022-530958.
Notice of Preliminary Rejection dated Dec. 5, 2024 for Korean Patent Application No. 10-2022-7018432.

* cited by examiner

BATTERY MODULE, BATTERY PACK, AND DEVICE USING SECONDARY BATTERY

CROSS-REFERENCE TO RELATED APPLICATIONS

This application is a continuation of International Application No. PCT/CN2020/141800, filed on Dec. 30, 2020, which claims priority to Chinese Patent Application No. 202010259301.1, filed on Apr. 3, 2020 and entitled "BATTERY MODULE, BATTERY PACK, AND DEVICE USING SECONDARY BATTERY", which is incorporated herein by reference in its entirety.

TECHNICAL FIELD

This application relates to the field of batteries, and in particular, to a battery module, a battery pack, and a device using a secondary battery.

BACKGROUND

In recent years, rechargeable batteries have been widely used to provide power for high-power devices such as an electric vehicle. To achieve a relatively high capacity or power of a rechargeable battery, a plurality of battery cells are generally connected to electrode terminals by a busbar to form at least one of a serial connection or a parallel connection. However, in a process of using the battery, as the number of charge and discharge cycles increases, the battery expands. The expansion causes a tensile force exerted by the busbar on the electrode terminals, thereby affecting reliability of the battery in use.

SUMMARY

This application provides a battery module, a battery pack, and a device using a secondary battery, and can improve reliability of a battery in use.

According to a first aspect of this application, a battery module is provided, including: a battery cell assembly, including at least two battery cells arranged along a third direction, where each of the battery cells includes electrode terminals; and a first busbar, including a main portion and two connecting portions. An extension direction of the first busbar tilts against the third direction at a preset angle. The two connecting portions are connected to the electrode terminals of the two battery cells in an identical battery cell assembly respectively. The main portion is connected between the two connecting portions. A deformation inducing portion is disposed on the main portion. The deformation inducing portion is configured to reduce at least a force required for deforming the main portion along a first direction. The first direction is parallel to a lateral surface of the battery cell and perpendicular to the third direction, where the lateral surface is a surface on which the electrode terminals are disposed.

In the battery module according to this embodiment of this application, a deformation inducing portion is disposed on the main portion to reduce at least a force required for deforming the main portion along the first direction. Therefore, when an electrode assembly in the battery cell expands, the first busbar is more easily deformable in the first direction, thereby reducing a tensile force exerted on the electrode terminals and ensuring high reliability of the connection between the electrode terminals and the electrode assembly. Moreover, the busbar can break off more easily in a case of thermal runaway, thereby improving safety of the battery in operation.

In some embodiments, the deformation inducing portion includes a gap. The gap runs through along a thickness direction of the main portion.

In the battery module according to this embodiment of this application, with the gap disposed, the cross-sectional area of the first busbar along the width direction is reduced, so as to reduce the rigidity along the width direction. The width direction of the first busbar tilts against the third direction. Therefore, the force required for deforming the main portion along the first direction and the third direction can be reduced concurrently, thereby reducing the tensile force on the electrode terminals. Moreover, when thermal runaway occurs, a fragile portion where the gap is located can fuse off more easily to break the circuit.

In some embodiments, the gap includes two transverse grooves. The two transverse grooves extend along a width direction of the first busbar and are spaced apart along a length direction of the first busbar.

In the battery module according to this embodiment of this application, the transverse grooves extending along the width direction of the first busbar can effectively reduce the cross-sectional area of the first busbar along the width direction in a local region, so as to reduce the rigidity along the width direction. In this way, the force required for deforming the main portion along the first direction and the third direction can be reduced effectively, thereby reducing the tensile force on the electrode terminals.

In some embodiments, the gap further includes a longitudinal groove. The longitudinal groove extends along the length direction of the first busbar. Two ends of the longitudinal groove communicate with the two transverse grooves respectively.

In the battery module according to this embodiment of this application, the longitudinal groove extending along the length direction of the first busbar is added, so as to evenly reduce the cross-sectional area of the first busbar along the width direction within a section of a preset length of the main portion, and reduce the rigidity in the section of such length of the main portion along the width direction. In this way, the first busbar can evenly deform as a whole when subjected to an external force, so as to reduce the tensile force on the electrode terminals, and prevent the first busbar from affecting the service life due to large local deformation. Moreover, the longitudinal groove can also reduce the impact on the current-carrying capacity of the first busbar.

In some embodiments, the gap further includes two longitudinal grooves. The two longitudinal grooves extend along the length direction of the first busbar and are spaced apart. One end of each longitudinal groove communicates with a corresponding transverse groove.

In the battery module according to this embodiment of this application, the two longitudinal grooves extend along the length direction of the first busbar and are spaced apart. One end of each longitudinal groove communicates with a corresponding transverse groove, thereby improving the connection reliability of the electrode terminals in a case that the rigidity of the first busbar is reduced.

In some embodiments, the deformation inducing portion includes a recess. The recess is disposed at a widthwise side of the main portion and is configured to reduce a width of the main portion.

In the battery module according to this embodiment of this application, with the recess disposed, the effect of the gap is strengthened, the rigidity of the first busbar along the width direction can be further reduced, and the force required for deforming the main portion along the first direction and the third direction can be further reduced. Therefore, the tensile force on the electrode terminals is reduced, and the reliability of the connection between the first busbar and each electrode terminal is improved. In addition, in a case of thermal runaway, the first busbar can break off more easily to break the circuit, thereby improving the reliability and safety of the battery module in operation.

In some embodiments, the recess is disposed at both widthwise sides of the main portion.

In the battery module according to this embodiment of this application, the recess is disposed at both widthwise sides of the main portion. Therefore, the first busbar is structurally symmetric with respect to a midline between the two widthwise sides and thereby receives the force evenly. Moreover, the rigidity at a lengthwise middle position of the main portion can be impaired. When either of the electrode terminals exerts an external force on the first busbar, deformation is more likely to occur. In addition, the middle position is relatively close to the first explosion-proof valves of both opposite battery cells on adjacent layers, making the first busbar more easily fusible in a case of thermal runaway.

In some embodiments, the deformation inducing portion includes a bend portion. The bend portion protrudes against the connecting portion along a thickness direction of the first busbar.

In the battery module according to this embodiment of this application, with the bend portion disposed, when the battery cell expands and exerts an external force on the first busbar along the length direction through the electrode terminals, the bend portion protrudes to form an elastic structure, so as to be easily stretched to absorb the external force received by the first busbar along the length direction when the battery cell expands, and reduce the tensile force on the electrode terminals. Moreover, the bend portion increases a surface area of the main portion to absorb more heat more easily. Because the recess portion reduces the width of the bend portion, the first busbar can break off easily at the recess when the battery cell is thermally runaway, thereby improving the safety of the battery module in operation.

In some embodiments, the bend portion protrudes against the connecting portion away from the battery cell.

In the battery module according to this embodiment of this application, the bend portion protrudes against the connecting portion away from the battery cell. This structure enables the first busbar to be disposed closer to the battery cell, so that the connection between the first busbar and each electrode terminal is stable and reliable. Moreover, the space at a side that is of the first busbar and that is away from the battery cell is sufficient for disposing the bend portion to meet the need of deformation.

In some embodiments, the bend portion is located at a lengthwise middle position of the main portion. The deformation inducing portion further includes a gap, and the gap is disposed symmetrically along the length direction of the first busbar with respect to the bend portion; and/or the deformation inducing portion further includes a recess, and at least a part of the recess is disposed at a side of the bend portion along a width direction of the first busbar, and is configured to reduce a width of the first busbar.

In the battery module according to this embodiment of this application, the bend portion is located at the middle position of the main portion along the length direction. The bend portion disposed can concurrently absorb the external force exerted by the two electrode terminals on the first busbar along the length direction. Moreover, the gap is disposed symmetrically along the length direction of the first busbar with respect to the bend portion. At least a part of the recess is disposed at a side of the bend portion along the width direction of the first busbar and is configured to reduce the width of the first busbar. Therefore, when the battery cell expands along the third direction, the first busbar receives an external force along the first direction and the third direction. Through combined action of the gap, the recess, and the bend portion, the first busbar is allowed to deform to effectively absorb the external force received in the first direction and the third direction, thereby minimizing the force on the electrode terminals and improving the reliability of the battery module in operation.

In some embodiments, the battery cell further includes a first explosion-proof valve. First explosion-proof valves of the two battery cells connected to the first busbar are located at two widthwise sides of the first busbar respectively.

In the battery module according to this embodiment of this application, the first explosion-proof valves of the two battery cells connected to the first busbar are located at two widthwise sides of the first busbar respectively. Therefore, when either an upper battery cell or a lower battery cell connected to the first busbar is thermally runaway, the first busbar can fuse off to protect other battery cells.

In some embodiments, the battery cell further includes a first explosion-proof valve. The first busbar at least partly overlays the first explosion-proof valve of the battery cell connected to the first busbar.

In the battery module according to this embodiment of this application, the first busbar at least partly overlays the first explosion-proof valve of the battery cell connected to the first busbar. Therefore, when either the upper battery cell or the lower battery cell connected to the first busbar is thermally runaway, heat, sparks, and dust in the battery cell will be ejected through the first explosion-proof valve and directly act on the first busbar, thereby making it easier to fuse off the first busbar.

In some embodiments, the battery module further includes a second busbar and a plurality of battery cell assemblies arranged along the first direction. Two adjacent battery cell assemblies are electrically connected by the second busbar. The second busbar extends along the first direction.

In the battery module according to this embodiment of this application, through the second busbar, a connection can be implemented between two adjacent battery cell assemblies to increase the capacity or power of the battery module.

According to a second aspect of this application, a battery pack is provided, including: a box assembly; and the battery module disclosed in the foregoing embodiment and disposed in the box assembly.

In the battery pack according to this embodiment, the box assembly can implement protection for the battery module. In addition, a deformation inducing portion is disposed on the first busbar in the battery module. When an electrode assembly in a battery cell expands, the first busbar is more easily deformable in the first direction, thereby reducing a tensile force exerted on the electrode terminals and ensuring high reliability of the connection between the electrode terminals and the electrode assembly. Moreover, this enables the busbar to break off more easily in a case of thermal runaway, thereby improving safety of the battery in operation.

In some embodiments, the box assembly includes a box and a beam. The beam is disposed inside the box and partitions the box into a plurality of accommodation cavities. At least one battery module is disposed in each accommodation cavity. Electrode terminals of each battery cell in each battery module are disposed toward the beam. A preset interval exists between the battery cell and a sidewall of the beam to form an exhaust duct.

In the battery module according to this embodiment of this application, when the battery cell is thermally runaway, the heat, sparks, and dust ejected through the first explosion-proof valve may fuse off the first busbar. An airflow flows toward two sides along the exhaust duct, and flows through the gap between the end of the beam and the inner wall of the box, and is expelled outward by means such as the second explosion-proof valve disposed on the box, so as to reduce the temperature in the box and improve the safety of the battery.

According to a third aspect of this application, a device using a secondary battery is provided. The device includes: at least one of the battery module or the battery pack according to the foregoing embodiment.

In the device using a secondary battery according to this embodiment of this application, a deformation inducing portion is disposed on the first busbar in the battery module and/or the battery pack. When the electrode assembly in the battery cell expands, the first busbar is more easily deformable in the first direction, thereby reducing a tensile force exerted on the electrode terminals and ensuring high reliability of the connection between the electrode terminals and the electrode assembly. Moreover, this enables the busbar to break off more easily in a case of thermal runaway, thereby improving safety of the battery in operation.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
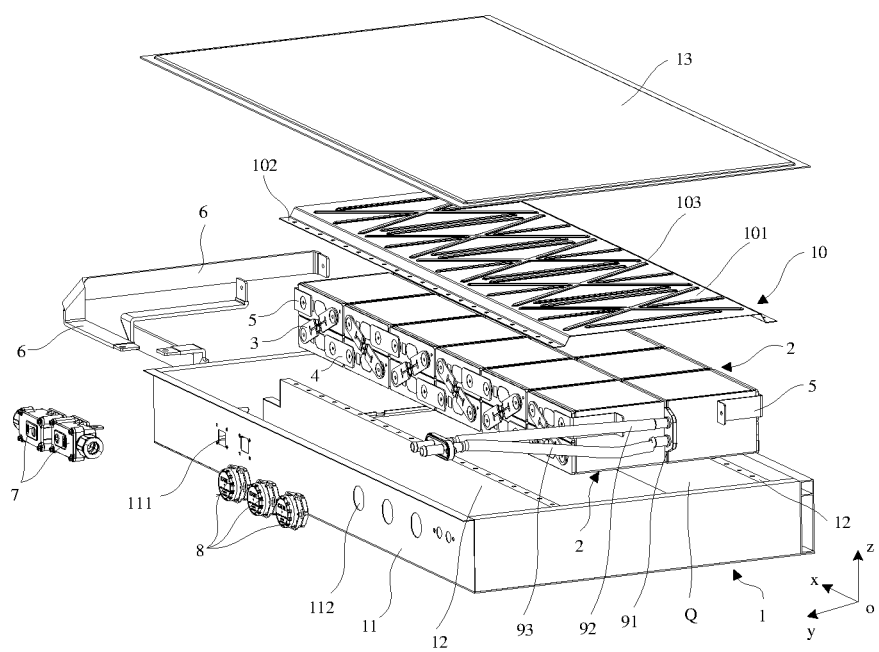
FIG. 1 is an exploded view of a battery pack according to some embodiments of this application.

The drawings are not drawn to scale.

Reference numerals: 1. Box assembly; 11. Box; 111. First mounting hole; 112. Second mounting hole; 12. Beam; 13. Upper cover; Q. Accommodation cavity; 2. Battery module; 2A. Battery cell assembly; 20. Battery cell; 21. Housing; 22. Electrode assembly; 221. First electrode plate; 222. Second electrode plate; 223. Separator; 224. Flattened face; 23. Adapter strip; 24. Cap assembly; 241. Cap; 242. Electrode terminal; 243. First explosion-proof valve; 3. First busbar; 31. Connecting portion; 32. Main portion; 33. Gap; 331. Transverse groove; 332. Longitudinal groove; 333. T-shaped groove; 34. Recess; 35. Bend portion; 4. Second busbar; 5. Output electrode; 6. Connecting piece; 7. Electrical connector; 8. Second explosion-proof valve; 9. Cooling part; 91. Cooling plate; 92. Inlet pipe; 93. Outlet pipe; 10. Constraint part; 101. Position limiting portion; 102. Mounting portion; and 103. Reinforcing rib.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

As shown in FIG. 1, this application provides a device using a secondary battery. The battery includes a battery module 2 or a battery pack. The battery pack may include a box assembly 1 and a battery module 2. One or more battery modules 2 are disposed in the box assembly 1. Devices using a secondary battery include a vehicle, a ship, an energy storage cabinet, an unmanned aerial vehicle, and the like. This application aims to improve the working performance of the device by improving the working reliability and safety of the battery module 2 or the battery pack.

To make a person of ordinary skill in the art more clearly understand the improvements made by this application, the following describes a battery pack first before describing a battery module 2.

As shown in FIG. 1, this application provides a battery pack. In some embodiments, the battery pack includes a box assembly 1, a constraint part 10, an upper cover 13, and a plurality of battery cells 20.

The box assembly 1 includes a box 11 and a beam 12. The box 11 contains an opening end. The beam 12 is fixed in the box 11. One or more beams 12 may be disposed to partition an internal space of the box 11 into a plurality of accommodation cavities Q. The battery cells 20 may be divided into a plurality of groups. Each group of battery cells 20 is disposed in a different accommodation cavity Q. A constraint part 10 is disposed corresponding to each group of battery cells 20. The constraint part 10 overlays the group of battery cells 20 and is fixed to the beam 12 and is configured to provide a steady pressing force to the battery cells 20, so as to restrict the battery cells 20 from expanding and increase the service life of the battery pack.

Still referring to FIG. 1, the constraint part 10 includes a position limiting portion 101 and two mounting portions 102. The position limiting portion 101 overlays the battery cells 20 in a corresponding group. The two mounting portions 102 are connected to two sides of the position limiting portion 101 along a grouping direction of the battery cells 20 respectively, and are fixed to the beams 12 at two sides of the battery cells 20 in the corresponding group along the grouping direction respectively. The position limiting portion 101 as a whole protrudes against the two mounting portions 102 away from the battery cells 20. An expansion force received by the constraint part 10 is very large when the entire module expands. Therefore, the constraint part 10 herein is fixed by riveting and gluing. This fixing method can greatly improve the connection strength of a pressure plate, and can reduce the number of fasteners and reduce costs in contrast to a practice of fixing by using a rivet nut followed by a screw. In addition, a fixing method other than the riveting and gluing method may be applied, that is, the two mounting portions 102 of the constraint part 10 are directly welded to the beam 12 by means of laser welding as long as the strength permits, thereby implementing the fixing method without a fastener. For example, the constraint part 10 may be formed by bending a flat plate. In order to improve deformation resistance of the constraint part 10, a reinforcing rib 103 may be disposed on the position limiting portion 101. For example, the reinforcing rib 103 is disposed on an outer surface of the position limiting portion 101 and may be formed by stamping. The structural strength of the constraint part 10 can be increased by disposing the reinforcing rib 103, thereby reducing weight and increasing rigidity and deflection of the entire constraint part 10.

The upper cover 13 is disposed at a side that is of the constraint part 10 and that is away from the box 11, and is snap-fitted to the opening end of the box 11 along a height direction of the battery pack to close off the opening end of the box 11. "Close off" here means a hermetic connection between the upper cover 13 and the box 11, and can prevent external liquid and moisture from entering the battery pack, and improve the safety performance of the battery pack. The box 11 and the upper cover 13 may be connected by a bolt or by other detachable connection means.

Figure 4:
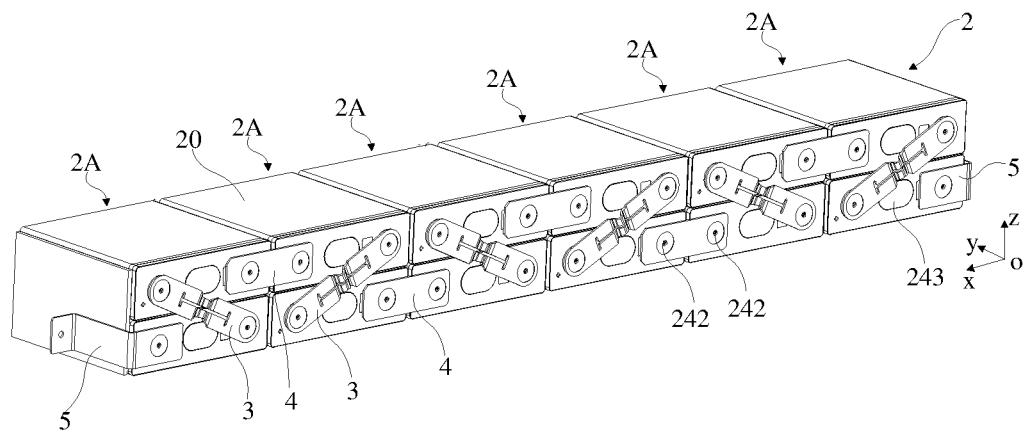
FIG. 4 is a schematic structural diagram of a battery module according to some embodiments of this application.

As shown in FIG. 4, the battery cells 20 in the battery pack can form a battery module 2 as a modular structure. The battery module 2 may be disposed in the battery pack or used independently.

In some embodiments, as shown in FIG. 4, the battery module 2 includes a battery cell assembly 2A and a first busbar 3. The battery cell assembly 2A includes at least two battery cells 20 arranged along a third direction z. Each of the battery cells 20 includes two electrode terminals 242: a positive electrode terminal and a negative electrode terminal.

Figure 5:
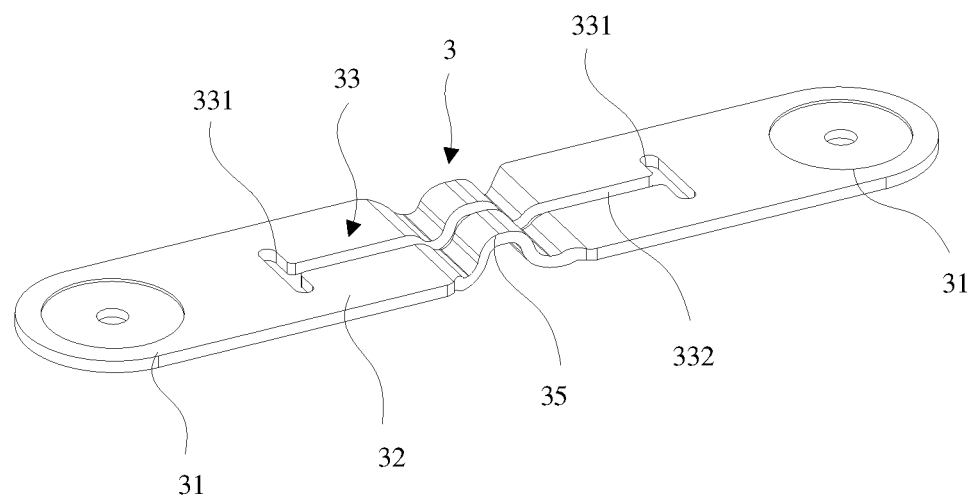
FIG. 5 is a three-dimensional view of a first busbar according to some embodiments.

As shown in FIG. 5, the first busbar 3 includes a main portion 32 and two connecting portions 31. An extension direction of the first busbar 3 tilts against the third direction z at a preset angle. The first busbar 3 and a second busbar 4 to be mentioned later may also be referred to as electrical connecting plates, aluminum bars, busbars, or the like. The first busbar 3 may be formed in a strip-shaped sheet structure.

The two connecting portions 31 are connected to the electrode terminals 242 of the two battery cells 20 in the same battery cell assembly 2A respectively. As shown in FIG. 4, in the same battery cell assembly 2A, the largest lateral surfaces of two adjacent battery cells 20 are disposed opposite to each other. The first busbar 3 is connected to the staggered electrode terminals 242 on the two battery cells 20.

The main portion 32 is located between the two connecting portions 31. A deformation inducing portion is disposed on the main portion 32. The deformation inducing portion is configured to reduce at least a force required for deforming the main portion 32 along a first direction x. The first direction x is parallel to a lateral surface of the battery cell 20 and perpendicular to the third direction z, where the lateral surface is a surface on which the electrode terminals 242 are disposed.

In this embodiment of this application, the first busbar 3 tilts against the third direction z at a preset angle. When the battery cell 20 expands along the third direction z, the generated expansion force is exerted on the first busbar 3 through the electrode terminal 242. Consequently, the first busbar 3 receives an external force along the length direction and an external force along the width direction concurrently.

In a technical solution in the related art, if the battery cells are arranged along the third direction z, the busbar is generally disposed parallel to the third direction z. When a battery cell expands, merely an external force along the length direction is exerted on the busbar, and the design of the busbar can reduce merely the force required to deform the busbar along the length direction. If such busbar tilts when connecting to the battery cell 20, a considerable force is still received in the width direction of the busbar when the battery cell 20 expands. In this embodiment of this application, a deformation inducing portion is disposed on the main portion 32. Therefore, the first busbar 3 is easily deformable in the first direction x to absorb the external force, thereby reducing the tensile force exerted on the electrode terminals 242 and ensuring high reliability of the connection between the electrode terminals 242 and the electrode assembly.

As shown in FIG. 4, the size of the battery cell 20 along the third direction z is smaller than the size along the first direction x. Therefore, when the battery cell 20 expands along the third direction z, the first busbar 3 receives the external force along the first direction x and the external force along the third direction z concurrently, where the external force along the first direction x is greater than the external force along the third direction z. With the deformation inducing portion disposed, the first busbar 3 is easily deformable in the first direction x to absorb a majority of the external force, thereby significantly reducing the tensile force exerted on the electrode terminals 242 and ensuring high reliability of the connection between the electrode terminals 242 and the electrode assembly.

Moreover, as shown in FIG. 4, the battery cell 20 further includes a first explosion-proof valve 243. The first explosion-proof valve 243 is disposed between the two electrode terminals 242. The first busbar 3 is connected to the two staggered electrode terminals 242 on the two battery cells 20. Therefore, by this connection method, the first busbar 3 is closer to the first explosion-proof valves 243 of the two battery cells 20 connected to the first busbar. At the first explosion-proof valves, heat is concentrated. In addition, with the deformation inducing portion disposed, the first busbar 3 breaks off more easily in a case of thermal runaway, so as to break a high-voltage circuit of the entire battery module 2, raise a thermal runaway alarm and take protection measures in time, and improve safety of the battery in operation.

As shown in FIG. 5, the deformation inducing portion is symmetric with respect to a lengthwise middle position of the main portion (32), so that the first busbar 3 receives a force evenly and brings the same acting effect on the two battery cells 20. Moreover, when the battery cell 20 is thermally runaway, the middle position is a thermal stress concentration point of a thermal field due to the deformation inducing portion disposed, and can fuse off the first busbar 3 quickly to break the high-voltage circuit of the entire module, thereby allowing enough time to raise a thermal runaway alarm and take protection measures.

The deformation inducing portion in this embodiment of this application may be in various forms of structure. For example, at least one of a groove, a through-groove, a gap 33, a blind hole, or a via hole is disposed on a lateral surface that is of the main portion 32 and that is perpendicular to the thickness direction; or, a recess 34 is disposed on a lateral surface that is of the main portion 32 and that is perpendicular to the width direction. All variations fall within the protection scope of this application as long as the first busbar 3 is formed of an appropriate material and contains a deformation inducing portion that can reduce the rigidity of the main portion 32 along the first direction (x).

As shown in FIG. 5, the deformation inducing portion includes a gap 33. The gap 33 runs through along the thickness direction of the main portion 32. A cross-sectional area of the first busbar 3 at a position where the deformation inducing portion is disposed is configured to satisfy the current-carrying capacity of the first busbar 3.

In this embodiment, with the gap 33 disposed, the cross-sectional area of the first busbar 3 along the width direction is reduced, so as to reduce the rigidity along the width direction. The width direction of the first busbar 3 tilts against the third direction z. Therefore, the force required for deforming the main portion 32 along the first direction x and the third direction z can be reduced concurrently, thereby reducing the tensile force on the electrode terminals 242. Moreover, when thermal runaway occurs, a fragile portion where the gap 33 is located can fuse off more easily to break the circuit.

As shown in FIG. 5 to FIG. 8, the gap 33 includes two transverse grooves 331. The two transverse grooves 331 extend along the width direction of the first busbar 3 and are spaced apart along the length direction of the first busbar 3. The two transverse grooves 331 may be disposed in a middle region of the main portion 32 along the width direction.

The transverse grooves 331 extending along the width direction of the first busbar 3 can effectively reduce the cross-sectional area of the first busbar 3 along the width direction in a local region, so as to reduce the rigidity along the width direction. In this way, the force required for deforming the main portion 32 along the first direction x and the third direction z can be reduced effectively, thereby reducing the tensile force on the electrode terminals 242.

Figure 8:
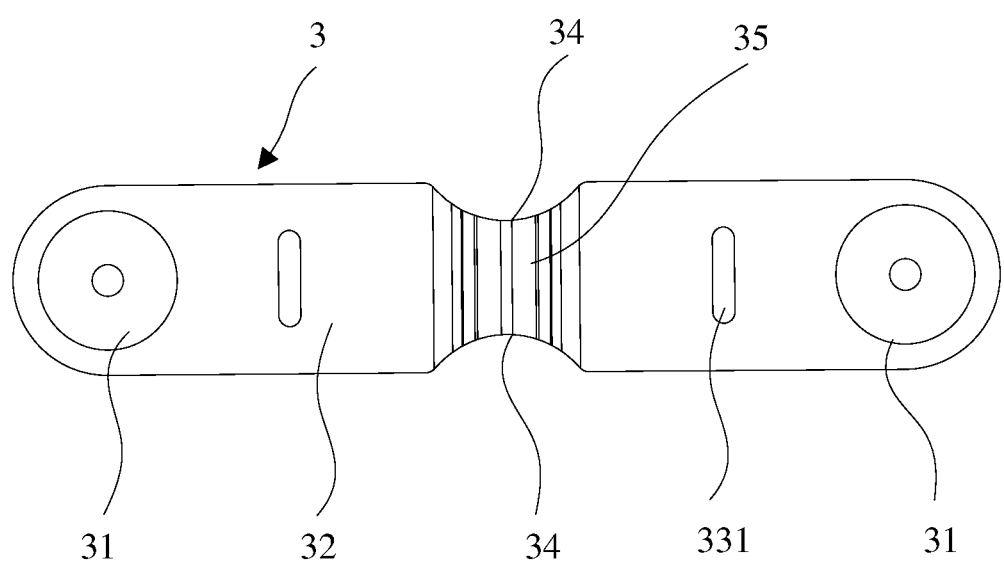
FIG. 8 is a schematic structural diagram of a first busbar according to still other embodiments.

As shown in FIG. 8, the two transverse grooves 331 are disposed at positions close to the two electrode terminals 242 on the main portion 32 along the length direction. In this way, when any electrode terminal 242 exerts an external force on the connected first busbar 3, the first busbar 3 is easily deformable effectively to reduce the tensile force on the electrode terminal 242.

Figure 6:
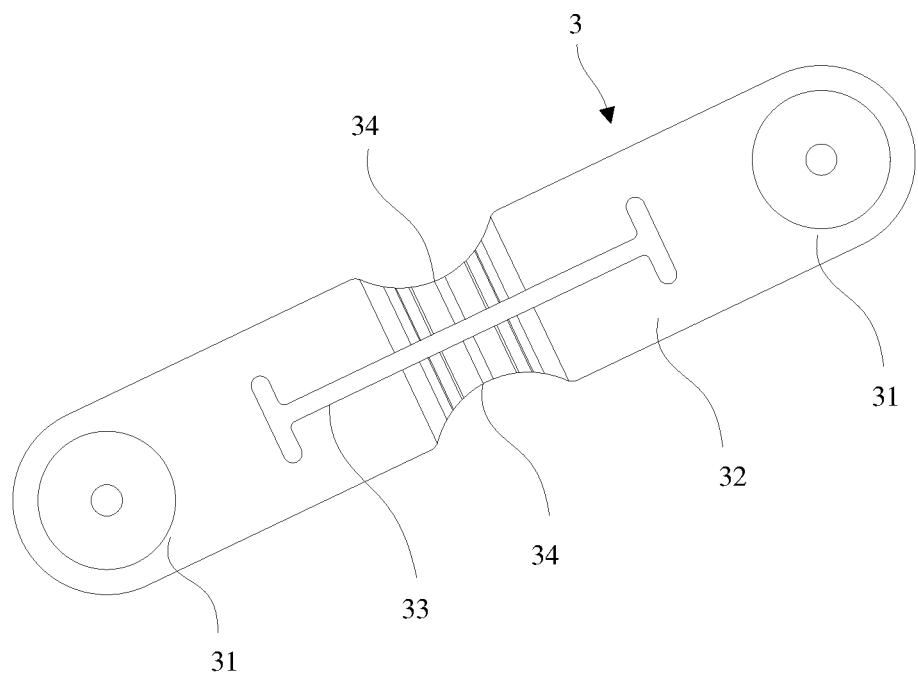
FIG. 6 is a rear view of a first busbar shown in FIG. 5.

As shown in FIG. 5 and FIG. 6, the gap 33 further includes a longitudinal groove 332. The longitudinal groove 332 extends along the length direction of the first busbar 3, and two ends of the longitudinal groove 332 communicate with the two transverse grooves 331 respectively. Both the longitudinal groove 332 and the two transverse grooves 331 may be disposed in a middle region of the main portion 32 along the width direction.

The longitudinal groove 332 extending along the length direction of the first busbar 3 is added, so as to evenly reduce the cross-sectional area of the first busbar 3 along the width direction within a section of a preset length of the main portion 32, and reduce the rigidity in the section of such length of the main portion along the width direction. In this way, the first busbar 3 can evenly deform as a whole when subjected to an external force, so as to reduce the tensile force on the electrode terminals 242, and prevent the first busbar 3 from affecting the service life due to large local deformation. Moreover, the longitudinal groove 332 can also reduce the impact on the current-carrying capacity of the first busbar 3.

On the basis of ensuring high connection strength, the length of the longitudinal groove 332 may be increased as much as practicable. When the width of the longitudinal groove 332 is relatively large, the current-carrying capacity of the first busbar 3 will be affected. With the transverse grooves 331 disposed, the rigidity of the first busbar 3 is further reduced on the basis of ensuring the current-carrying capacity of the first busbar 3, thereby minimizing the tensile force exerted on the electrode terminals 242 and making it easier to break off the first busbar in a case of thermal runaway.

Figure 7:
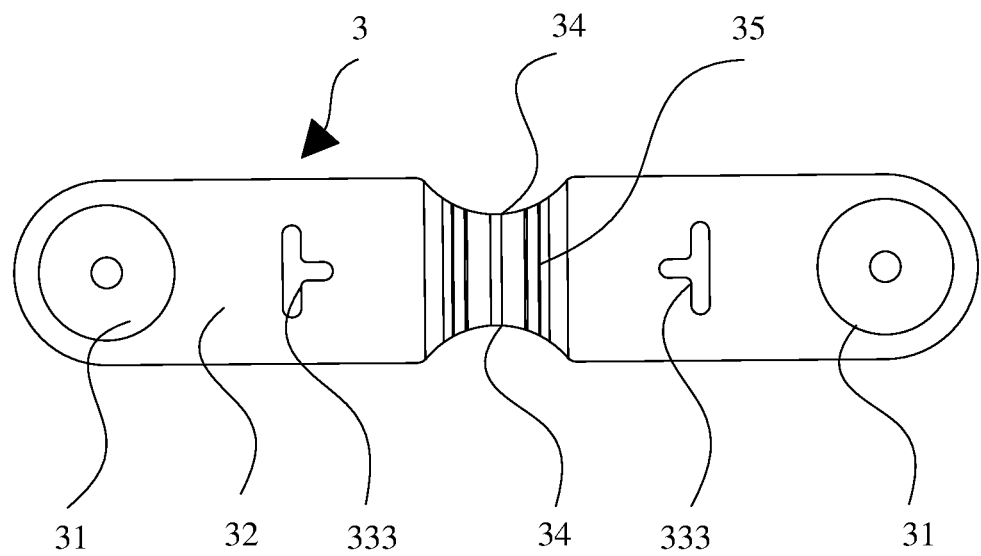
FIG. 7 is a schematic structural diagram of a first busbar according to other embodiments.

As shown in FIG. 7, the gap 33 further includes two longitudinal grooves 332. The two longitudinal grooves 332 extend along the length direction of the first busbar 3 and are spaced apart. One end of each longitudinal groove 332 communicates with a corresponding transverse groove 331. For example, the two longitudinal grooves 332 extend opposite to each other. The longitudinal groove 332 and each transverse groove 331 that communicate with each other form a T-shaped groove. The two T-shaped grooves are disposed symmetrically with respect to a lengthwise middle position of the main portion 32, and are both located in a widthwise middle region of the main portion 32.

Such a structure can improve the connection reliability of the electrode terminals 242 while reducing the rigidity of the first busbar 3.

On this basis, as shown in FIG. 6 to FIG. 8, the deformation inducing portion includes a recess 34. The recess 34 is disposed at a side of the main portion 32 along the width direction, and is configured to reduce the width of the first busbar 3. For example, a sidewall of the recess 34 may be arc-shaped, hyperbola-shaped, parabola-shaped, or the like to mitigate stress concentration, or may be polygonal.

With the recess 34 disposed, the effect of the gap 33 is strengthened, the rigidity of the first busbar 3 along the width direction can be further reduced, and the force required for deforming the main portion 32 along the first direction x and the third direction z can be further reduced. Therefore, the tensile force on the electrode terminals 242 is reduced, and the reliability of the connection between the first busbar 3 and each electrode terminal 242 is improved. In addition, in a case of thermal runaway, the first busbar can break off more easily to break the circuit, thereby improving the reliability and safety of the battery module 2 in operation.

Still referring to FIG. 6 to FIG. 8, the recess 34 may be disposed at a middle position of the main portion 32 along the length direction. For example, the recess 34 is disposed at both sides of the main portion 32 along the width direction.

In this structure, the first busbar 3 is structurally symmetric with respect to a midline between the two widthwise sides and thereby receives the force evenly. Moreover, the rigidity at the middle position along the length direction can be reduced. When either of the electrode terminals 242 exerts an external force on the first busbar 3, deformation occurs more easily. In addition, the middle position is relatively close to the first explosion-proof valves 243 of both battery cells 20 connected to the first busbar, so that the first busbar 3 can fuse off more easily in a case of thermal runaway.

As shown in FIG. 5, the deformation inducing portion includes a bend portion 35. The bend portion 35 protrudes against the connecting portion 31 toward at least one side in the thickness direction of the first busbar 3. That is, the bend portion 35 arches outward against the main portion 32. For example, the bend portion 35 may be arc-shaped, U-shaped, rectangular, trapezoidal, or the like In this embodiment, with the bend portion 35 disposed, when the battery cell 20 expands and exerts an external force on the first busbar 3 along the length direction through the electrode terminals 242, the bend portion 35 protrudes to form an elastic structure, so as to be easily stretched to absorb the external force received by the first busbar 3 along the length direction when the battery cell 20 expands, and reduce the tensile force on the electrode terminals 242. Moreover, the bend portion 35 increases a surface area of the main portion 32 to absorb more heat more easily. Because the recess portion 34 reduces the width of the bend portion 35, the first busbar 3 can break off easily at the recess when the battery cell 20 is thermally runaway, thereby improving the safety of the battery module 2 in operation.

As shown in FIG. 4, the bend portion 35 as a whole protrudes against the connecting portion 31 away from the battery cell 20. This structure enables the first busbar 3 to be disposed closer to the battery cell 20, so that the connection between the first busbar 3 and each electrode terminal 242 is stable and reliable. Moreover, the space at a side that is of the first busbar 3 and that is away from the battery cell 20 is sufficient for disposing the bend portion 35 to meet the need of deformation.

As shown in FIG. 5, the bend portion 35 is located at the middle position of the main portion 32 along the length direction. The bend portion 35 disposed can concurrently absorb the external force exerted by the two electrode terminals 242 on the first busbar 3 along the length direction.

For the battery module 2 shown in FIG. 4 and FIG. 5, the deformation inducing portion includes a gap 33, a recess 34, and a bend portion 35. The bend portion 35 is located at the middle position of the main portion 32 along the length direction. The gap 33 is disposed symmetrically along the length direction of the first busbar 3 with respect to the bend portion 35. For example, the two transverse grooves 331 of the gap 33 are located at two sides of the bend portion 35 respectively, and the two ends of the longitudinal groove 332 pass through the bend portion 35 along the length direction and communicate with the two transverse grooves 331 respectively. At least a part of the recess 34 is disposed at a side of the bend portion 35 along the width direction of the first busbar 3 and is configured to reduce the width of the first busbar 3.

With the battery module 2 according to this embodiment, when the battery cell 20 expands along the third direction z, the first busbar 3 receives an external force along the first direction x and the third direction z. Through combined action of the gap 33, the recess 34, and the bend portion 35, the first busbar 3 is allowed to deform to effectively absorb the external force received in the first direction x and the third direction z, thereby minimizing the force on the electrode terminals 242 and improving the reliability of the battery module 2 in operation.

As shown in FIG. 4, the battery cell 20 further includes a first explosion-proof valve 243. The first explosion-proof valves 243 of the two battery cells 20 connected to the first busbar 3 are located at two sides of the first busbar 3 in the width direction respectively. With this structure, when either the upper battery cell 20 or the lower battery cell connected to the first busbar 3 is thermally runaway, the first busbar 3 can fuse off to protect other battery cells 20.

Still referring to FIG. 4, the first busbar 3 at least partly overlays the first explosion-proof valve 243 of the battery cell 20 connected to the first busbar. When either the upper battery cell 20 or the lower battery cell connected to the first busbar 3 is thermally runaway, heat, sparks, and dust in the battery cell 20 will be ejected through the first explosion-proof valve 243 and directly act on the first busbar 3, thereby making it easier to fuse off the first busbar 3.

As shown in FIG. 4, the battery module 2 further includes a second busbar 4 and a plurality of battery cell assemblies 2A arranged along the first direction x. Two adjacent battery cell assemblies 2A are electrically connected by the second busbar 4. The second busbar 4 extends along the first direction x. For the battery module shown in FIG. 4, each first busbar 3 and each second busbar 4 are alternately arranged along the first direction x. The battery cells 20 are serially connected. Two adjacent first busbars 3 tilt in opposite directions. The second busbar 4 may adopt a structure similar to that of the first busbar 3, or may omit the deformation inducing portion.

As shown in FIG. 4, the battery module 2 further includes two output electrodes 5 configured to output a positive electrode and a negative electrode of the battery module 2 formed by connecting the battery cells 20.

On the basis of the foregoing embodiment, as shown in FIG. 1, a battery pack may include at least one battery module 2. The battery modules 2 may be arranged alongside or spaced apart along the second direction y. For example, two battery modules 2 may be disposed between two adjacent beams 12. The largest lateral surfaces of the battery cells 20 may be approximately parallel to the bottom surface of the box 11. This placement method is also known as flat placement. The height of the battery cell 20 in the third direction z is relatively small. Therefore, the flat placement method reduces the overall height of the battery module 2, and is more suitable for a device in which the battery installation space is relatively short.

Figure 2:
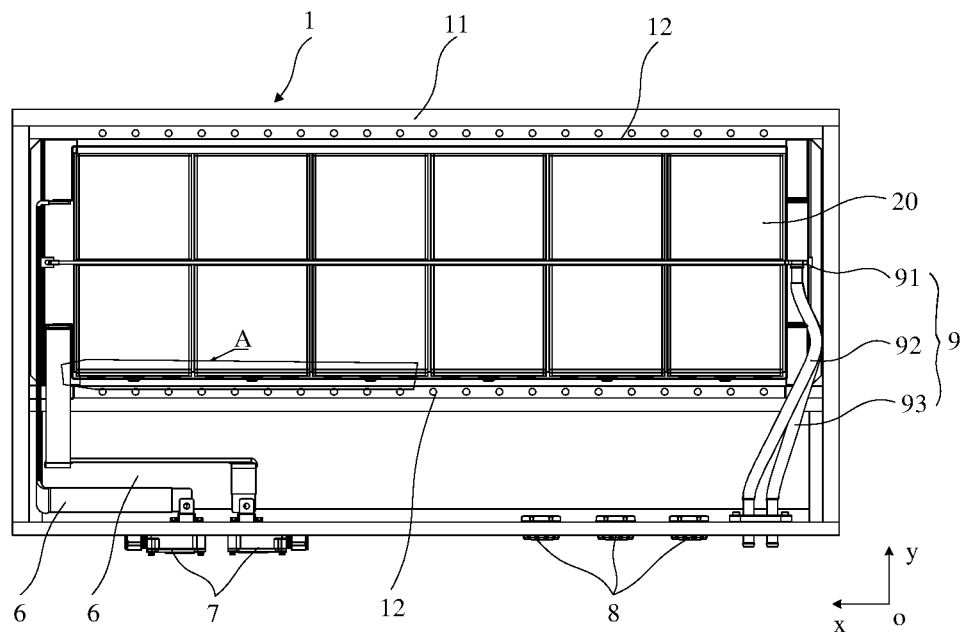
FIG. 2 is a top view of an internal structure of a battery pack according to some embodiments of this application.

The battery modules 2 described in the foregoing embodiments may be disposed in a battery pack. As shown in FIG. 1, a box assembly 1 includes a box 11 and a beam 12. The beam 12 is fixed in the box 11, and partitions an internal space of the box 11 into a plurality of accommodation cavities Q. At least one battery module 2 is disposed in each accommodation cavity Q. As shown in FIG. 1 and FIG. 2, the battery pack further includes a connecting piece 6 configured to connect the output electrodes 5 in each battery module 2 to implement serial connection or parallel connection of the battery modules 2, so as to achieve electrical performance required by the battery pack. A first mounting hole 111 may be disposed on the box 11, and is configured to mount an electrical connector 7.

The electrode terminals 242 of each battery cell 20 in each battery module 2 are disposed toward the beam 12, and a preset interval L exists between the battery cell 20 and a lateral surface on which the electrode terminals 242 are disposed, and a sidewall of the beam 12, to form an exhaust duct B.

Figure 3:
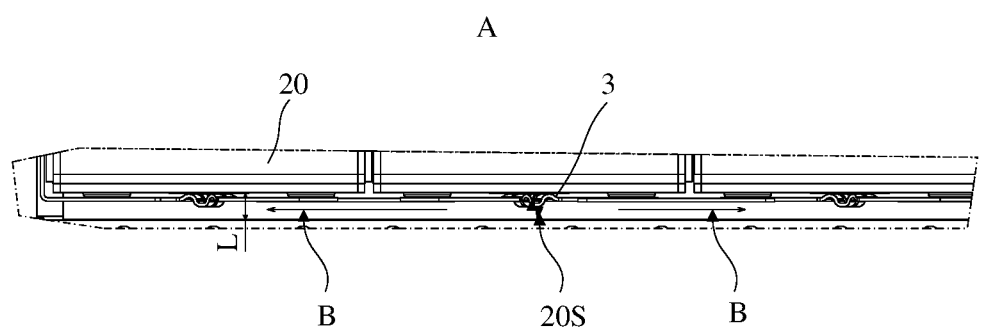
FIG. 3 is a local detailed view of a part A of a battery pack shown in FIG. 2.

As shown in FIG. 3, when the battery cell 20 is thermally runaway, the heat, sparks, and dust ejected through the first explosion-proof valve 243 may fuse off the first busbar 3. An airflow flows toward two sides along the exhaust dust B, and flows to the second explosion-proof valve 8 through the gap between the end of the beam 12 and the inner wall of the box 11, and is finally expelled outward through the second explosion-proof valve 8 to reduce the temperature in the box 11 and improve battery safety. At least one second mounting hole 112 is disposed on the box 11. The second explosion-proof valve 8 is mounted on the box 11 through the second mounting hole 112.

To take away the heat generated by the battery in operation, as shown in FIG. 1 and FIG. 2, the battery pack further includes a cooling part 9. The cooling part 9 includes a cooling plate 91, in which a cooling cavity is disposed. Both an inlet pipe 92 and an outlet pipe 93 communicate with the cooling cavity of the cooling plate 91. In a plane formed by the first direction x and the second direction y, two adjacent battery modules 2 may be mounted with the electrode terminals 242 being away from each other, thereby saving installation space. In addition, in disposing the cooling plate 91, the cooling plate 91 may be disposed between two adjacent battery modules 2 so that the two adjacent battery modules 2 are cooled concurrently by one cooling plate 91.

In some embodiments, the two adjacent battery modules 2 may be mounted with the electrode terminals 242 facing each other. A safe distance needs to be reserved between the electrode terminals 242 of the adjacent battery modules 2. When cooling is needed, a cooling plate 91 may be respectively disposed at lateral surfaces that are of the two battery modules 2 and that are away from the electrode terminals 242.

In addition, the method of connection between the first busbar 3 and the second busbar 4 and the battery cell 20 as well as the structural forms, which are described in this application, are applicable not only to a structure in which the battery cells 20 are placed flatly, but also to the battery module 2 in which the battery cells 20 are arranged vertically.

The following describes applicable structures of the battery cells 20 described in the foregoing embodiments.

Figure 9:
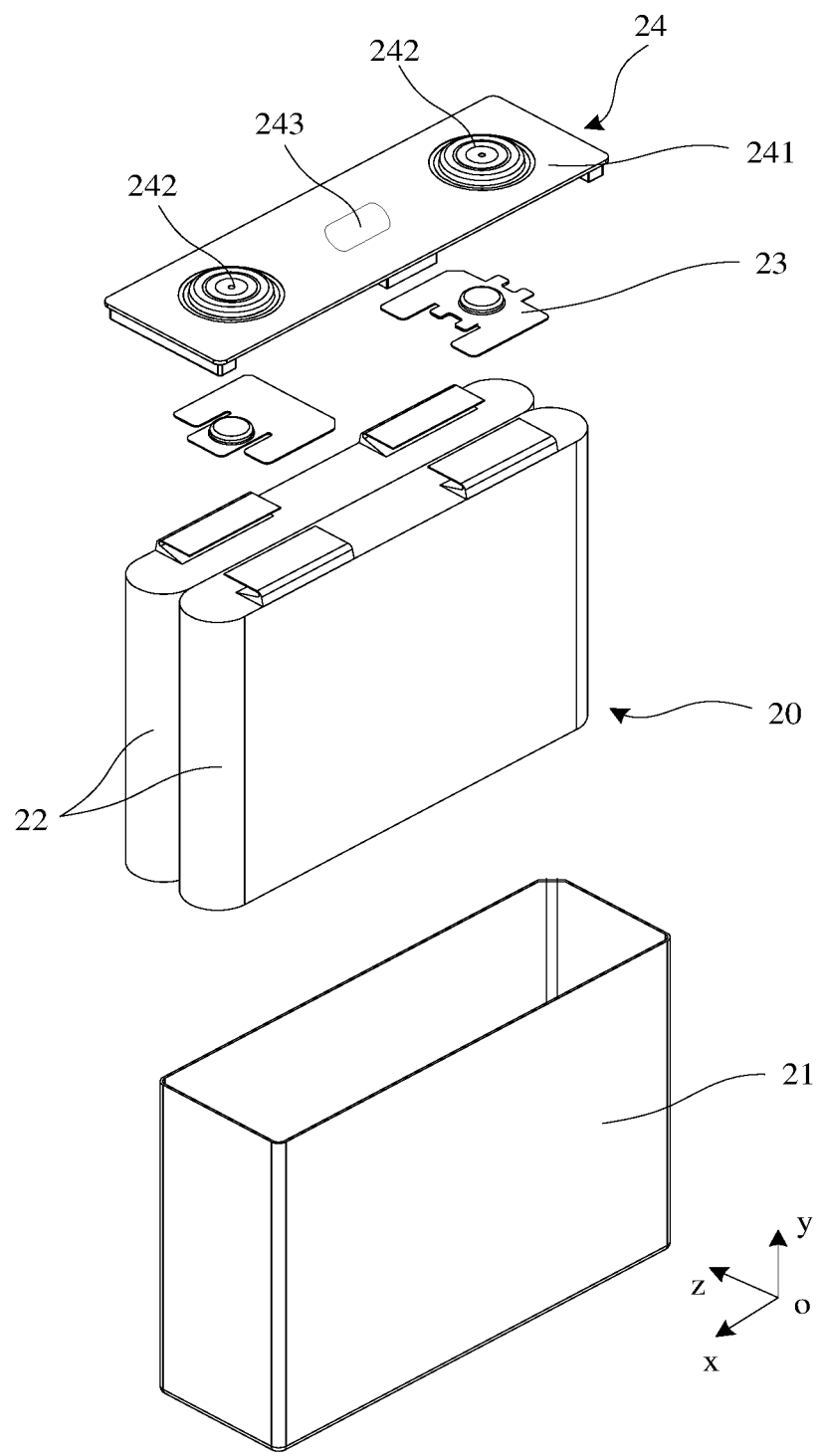
FIG. 9 is an exploded view of a battery cell in a battery pack according to an embodiment of this application.

Referring to the schematic exploded view shown in FIG. 9, each battery cell 20 includes a housing 21 and an electrode assembly 22 disposed in the housing 21. The housing 21 may be in a hexahedral shape or other shapes, and contains an opening. The electrode assembly 22 is accommodated in the housing 21. The opening of the housing 21 is covered with a cap assembly 24. The cap assembly 24 includes a cap 241 and two electrode terminals 242 disposed on the cap 241. The two electrode terminals 242 are a first electrode terminal and a second electrode terminal. The first electrode terminal may be a positive electrode terminal, and the second electrode terminal may be a negative electrode terminal. In other embodiments, the first electrode terminal may be a negative electrode terminal, and the second electrode terminal may be a positive electrode terminal. An adapter strip 23 is disposed between the cap assembly 24 and the electrode assembly 22. Tabs of the electrode assembly 22 are electrically connected to the electrode terminals on the cap 241 through the adapter strip 23. In this embodiment, there are two adapter strips 23: a positive adapter strip and a negative adapter strip. A first explosion-proof valve 243 is disposed between the two electrode terminals 242 on the cap 241.

As shown in FIG. 9, two electrode assemblies 22 are disposed in the housing 21. The two electrode assemblies 22 are stacked along a height direction (Z direction) of the battery cells 20. The height direction of the battery cells 20 is identical to the height direction of the battery pack. Nevertheless, in other embodiments, one electrode assembly 22 may be disposed in the housing 21, or at least three electrode assemblies 22 are disposed in the housing 21. A plurality of electrode assemblies 22 are stacked in the height direction (z direction) of the battery cells 20.

Figure 10:
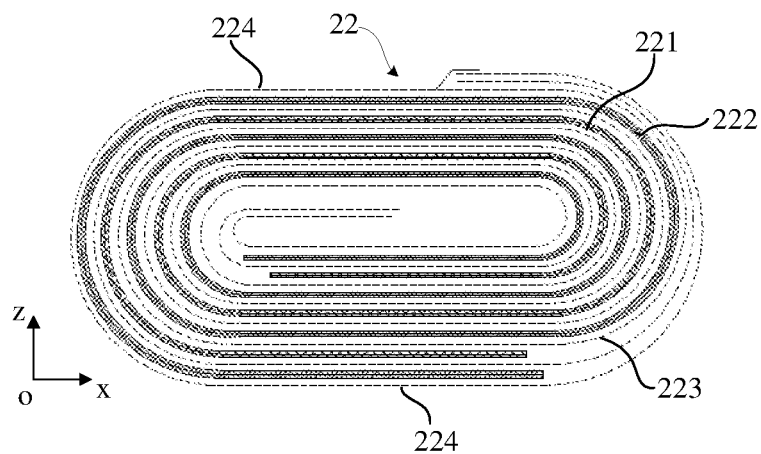
FIG. 10 is a schematic structural diagram of an electrode assembly in a battery cell according to some embodiments.
Figure 11:
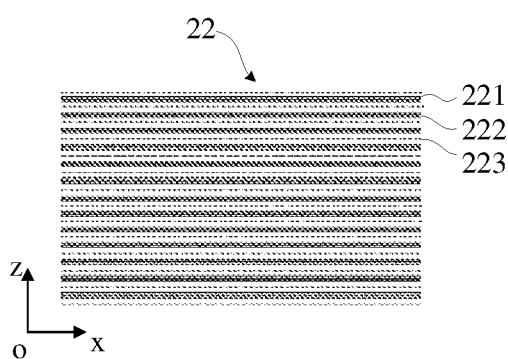
FIG. 11 is a schematic structural diagram of an electrode assembly in a battery cell according to other embodiments.

As shown in FIG. 10 and FIG. 11, the electrode assembly 22 includes a first electrode plate 221, a second electrode plate 222, and a separator 223 disposed between the first electrode plate 221 and the second electrode plate 222. The first electrode plate 221 may be a positive electrode plate and the second electrode plate 222 may be a negative electrode plate. In other embodiments, the first electrode plate 221 may be a negative electrode plate, and the second electrode plate 222 may be a positive electrode plate. The separator 223 is an insulator between the first electrode plate 221 and the second electrode plate 222. An active material of the positive electrode plate may be coated onto a coated region of the positive electrode plate, and an active material of the negative electrode plate may be coated onto a coated region of the negative electrode plate. A part extending from the coated region of the positive electrode plate serves as a positive tab, and a part extending from the coated region of the negative electrode plate serves as a negative tab. The positive tab is connected to the positive electrode terminal on the cap assembly 24 through the positive adapter strip. Likewise, the negative tab is connected to the negative electrode terminal on the cap assembly 24 through the negative adapter strip.

As shown in FIG. 10, the electrode assembly 22 is jell-roll structure. The first electrode plate 221, the separator 223, and the second electrode plate 222 are all strap-shaped structures. The first electrode plate 221, the separator 223, and the second electrode plate 222 are sequentially stacked and wound for at least two circles to form an electrode assembly 22. The electrode assembly 22 is flat. During preparation of the electrode assembly 22, the electrode assembly 22 may be wound into a flat shape directly, or wound into a hollow cylindrical structure first and then calendered into a flat shape. FIG. 10 is a schematic outline of the electrode assembly 22. Outer surfaces of the electrode assembly 22 include two flattened faces 224. The two flattened faces 224 are disposed opposite to each other along the height direction (z direction) of the battery cells 20. The electrode assembly 22 is an approximately hexahedral structure. The flattened faces 224 are approximately parallel to a winding axis and are outer surfaces that are largest in area. The flattened faces 224 may be surfaces that are relatively flat, but not necessarily exactly planar.

As shown in FIG. 11, the electrode assembly 22 is a stacked structure. To be specific, the electrode assembly 22 contains a plurality of first electrode plates 221 and a plurality of second electrode plates 222. A separator 223 is disposed between a first electrode plate 221 and a second electrode plate 222. The first electrode plate 221 and the second electrode plate 222 are stacked along the height direction (z direction) of the battery cells 20.

In a charge or discharge process, the electrode assembly 22 inevitably expands along the thickness direction of the electrode plate. The expansion amounts of all electrode plates are accumulated. The expansion amount accumulated in the height direction is larger than the expansion amount accumulated in other directions, so that an external force is exerted on the first busbar 3 through the electrode terminal 242. By improving the connection relationship and structure of the busbar between the battery cells, this embodiment of this application can improve the reliability and safety of the battery in operation.

Although this application has been described with reference to exemplary embodiments, various improvements may be made to the embodiments without departing from the scope of this application, and the components therein may be replaced with equivalents. Particularly, to the extent that no structural conflict exists, various technical features mentioned in various embodiments can be combined in any manner. This application is not limited to the specific embodiments of this application, but includes all technical solutions falling within the scope of the claims.

What is claimed is:

1. A battery module, comprising:
a battery cell assembly, comprising at least two battery cells arranged along a third direction, wherein each of the battery cells comprises electrode terminals; and
a first busbar, comprising a main portion and two connecting portions, wherein an extension direction of the first busbar tilts against the third direction at a preset angle, the two connecting portions are connected to the electrode terminals of the two battery cells in an identical cell assembly respectively, the main portion is connected between the two connecting portions, a deformation inducing portion is disposed on the main portion, and the deformation inducing portion is configured to reduce at least a force required for deforming the main portion along a first direction, and the first direction is parallel to a lateral surface of the battery cell and perpendicular to the third direction, wherein the lateral surface is a surface on which the electrode terminals are disposed;
wherein the deformation inducing portion comprises a gap, and the gap runs through along a thickness direction of the main portion, the gap comprises two transverse grooves, and the two transverse grooves extend along a width direction of the first busbar and are spaced apart along a length direction of the first busbar;
wherein the gap further comprises a longitudinal groove, the longitudinal groove extends along the length direction of the first busbar, and the longitudinal groove communicate with the two transverse grooves.

2. The battery module according to claim 1, wherein two ends of the longitudinal groove communicate with the two transverse grooves respectively.

3. The battery module according to claim 1, wherein the longitudinal groove comprises two longitudinal grooves, the two longitudinal grooves are spaced apart along the length direction of the first busbar, and one end of each longitudinal groove communicates with a corresponding transverse groove.

4. The battery module according to claim 1, wherein the deformation inducing portion comprises a recess, and the recess is disposed at a widthwise side of the main portion and is configured to reduce a width of the main portion.

5. The battery module according to claim 4, wherein the recess is disposed at both widthwise sides of the main portion.

6. The battery module according to claim 1, wherein the deformation inducing portion comprises a bend portion, and the bend portion protrudes against the connecting portion along a thickness direction of the first busbar.

7. The battery module according to claim 6, wherein the bend portion protrudes against the connecting portion away from the battery cell.

8. The battery module according to claim 6, wherein the bend portion is located at a lengthwise middle position of the main portion;
the deformation inducing portion further comprises a gap, and the gap is disposed symmetrically along a length direction of the first busbar with respect to the bend portion; and/or the deformation inducing portion further comprises a recess, and at least a part of the recess is disposed at a side of the bend portion along a width direction of the first busbar, and is configured to reduce a width of the first busbar.

9. The battery module according to claim 1, wherein the battery cell further comprises a first explosion-proof valve, and first explosion-proof valves of the two battery cells connected to the first busbar are located at two widthwise sides of the first busbar respectively.

10. The battery module according to claim 1, wherein the battery cell further comprises a first explosion-proof valve, and the first busbar at least partly overlays the first explosion-proof valve of the battery cell connected to the first busbar.

11. The battery module according to claim 1, further comprising a second busbar and a plurality of battery cell assemblies arranged along the first direction, two adjacent battery cell assemblies are electrically connected by the second busbar, and the second busbar extends along the first direction.

12. A battery pack, comprising:
a box assembly; and
the battery module according to claim 1, disposed in the box assembly.

13. The battery pack according to claim 12, wherein the box assembly comprises a box and a beam, and the beam is disposed inside the box and partitions the box into a plurality of accommodation cavities; and
at least one battery module is disposed in each accommodation cavity, the electrode terminals of each battery cell in each battery module are disposed toward the beam, and a preset interval exists between the battery cell and a sidewall of the beam to form an exhaust duct.

14. A device using a secondary battery, comprising:
the battery module according to claim 1.

* * * * *